(12) United States Patent
Lewis et al.

(10) Patent No.: US 8,200,471 B2
(45) Date of Patent: Jun. 12, 2012

(54) APPARATUS AND METHODS FOR MODELING POWER CHARACTERISTICS OF ELECTRONIC CIRCUITRY

(75) Inventors: David Lewis, Toronto (CA); Thomas Yau-Tsun Wong, Markham (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 12/534,103

(22) Filed: Jul. 31, 2009

(65) Prior Publication Data

US 2009/0299721 A1 Dec. 3, 2009

Related U.S. Application Data

(63) Continuation of application No. 11/314,734, filed on Dec. 21, 2005, now Pat. No. 7,580,824.

(51) Int. Cl.
*G06F 17/50* (2006.01)

(52) U.S. Cl. ............... 703/14; 703/2; 703/18; 716/109

(58) Field of Classification Search .......... 703/14, 703/2, 18; 375/224, 348, 286; 307/32; 716/7, 716/11, 13, 17, 18, 108, 109; 702/130; 257/202; 706/12; 713/502; 327/295, 291; 326/105, 326/38, 39, 40; 365/227
See application file for complete search history.

(56) References Cited

U.S. PATENT DOCUMENTS

| | | | | |
|---|---|---|---|---|
| 5,264,744 A * | 11/1993 | Mizukami et al. | ............... | 326/62 |
| 5,444,740 A * | 8/1995 | Mizukami et al. | ............ | 375/286 |
| 6,212,670 B1 * | 4/2001 | Kaviani | ........................... | 716/17 |
| 6,269,043 B1 * | 7/2001 | Batcher | ........................ | 365/227 |
| 6,304,836 B1 * | 10/2001 | Krivokapic et al. | ............ | 703/14 |
| 6,493,863 B1 * | 12/2002 | Hamada et al. | .................. | 716/18 |
| 6,975,154 B1 * | 12/2005 | Pedersen | ........................ | 327/295 |
| 6,980,026 B1 * | 12/2005 | Trimberger | ..................... | 326/40 |
| 7,076,405 B1 * | 7/2006 | Uchino | ............................ | 703/2 |
| 7,257,511 B1 * | 8/2007 | Hsieh et al. | .................... | 702/130 |
| 7,417,454 B1 * | 8/2008 | Rahman et al. | .................. | 326/38 |
| 7,504,854 B1 * | 3/2009 | Look et al. | ....................... | 326/38 |
| 7,549,139 B1 * | 6/2009 | Tuan et al. | ...................... | 716/108 |
| 7,810,058 B1 * | 10/2010 | Tuan | .............................. | 716/109 |
| 7,902,864 B1 * | 3/2011 | Hutton et al. | .................... | 326/39 |
| 2003/0088840 A1 * | 5/2003 | Yonezawa et al. | ................. | 716/7 |
| 2003/0097348 A1 * | 5/2003 | Cao | ................................. | 706/12 |
| 2004/0129951 A1 * | 7/2004 | Karasudani | ................... | 257/202 |
| 2004/0216069 A1 * | 10/2004 | Fujita et al. | ..................... | 716/11 |
| 2004/0239189 A1 * | 12/2004 | Sundstrom | ....................... | 307/32 |

(Continued)

OTHER PUBLICATIONS

Poon, K.K.W., "Power estimation for field programmable gate arrays", University of British Columbia, 2002.*

(Continued)

*Primary Examiner* — Kandasamy Thangavelu
(74) *Attorney, Agent, or Firm* — Law Offices of Maximilian R. Peterson

(57) ABSTRACT

Apparatus and methods for calculating power consumption of circuitry within integrated circuits (ICs), such as programmable logic devices (PLDs) are disclosed and described. A method of estimating power consumption of a circuit in an IC includes decomposing the IC into a plurality of overlapping blocks. Each block in the plurality of blocks includes a portion of the circuitry in the IC. The method further includes estimating power consumption of each block in the plurality of blocks, and estimating power consumption of the IC based on the power consumption of the plurality of blocks.

20 Claims, 12 Drawing Sheets

U.S. PATENT DOCUMENTS

| | | | | |
|---|---|---|---|---|
| 2004/0243959 A1* | 12/2004 | Takemura | | 716/7 |
| 2005/0008069 A1* | 1/2005 | Cao | | 375/224 |
| 2005/0036576 A1* | 2/2005 | Agazzi et al. | | 375/348 |
| 2005/0066214 A1* | 3/2005 | Obinata | | 713/502 |
| 2005/0093577 A1* | 5/2005 | Nguyen et al. | | 326/105 |
| 2005/0192787 A1* | 9/2005 | Kuwahara et al. | | 703/18 |
| 2005/0242867 A1* | 11/2005 | Ghia et al. | | 327/291 |
| 2005/0246676 A1* | 11/2005 | Sadakane et al. | | 716/13 |

OTHER PUBLICATIONS

Li et al., "Power modeling and charcateristics of Field Programmable gate arrays", IEEE, Nov. 2005.*

Li et al., "Arhitecture evaluation of power efficient FPGAs", ACM 2003.*

* cited by examiner

| in | ctl1/M1 | ctl2 | out |
|----|---------|------|-----|
| '1' | '1' | '0' | '0' |
| '1' | '1' | '0' | '1' |
| '1' | '1' | '1' | '1' |
| '0' | '1' | '0' | '0' |
| '0' | '1' | '0' | '1' |
| '0' | '1' | '1' | '0' |
| NA | '0' | '0' | '0' |
| NA | '0' | '0' | '1' |

APPARATUS AND METHODS FOR MODELING POWER CHARACTERISTICS OF ELECTRONIC CIRCUITRY

This patent application is a continuation of, and incorporates by reference, U.S. patent application Ser. No. 11/314,734, titled "APPARATUS AND METHODS FOR MODELING POWER CHARACTERISTICS OF ELECTRONIC CIRCUITRY," filed on Dec. 21, 2005, now U.S. Pat. No. 7,580,824.

TECHNICAL FIELD

The inventive concepts relate generally to modeling characteristics or properties of electronic circuits. More particularly, the invention concerns modeling power consumption or dissipation of electronic circuitry in integrated circuits (ICs), such as programmable logic devices (PLDs) or similar devices and circuits.

BACKGROUND

Modern ICs, such as PLDs, have increased, and continue to increase, in complexity. Typical PLDs contain several tens of millions of transistors. On the one hand, the increased complexity of the circuitry has resulted in improved performance levels and increased flexibility. On the other hand, the complexity and the large number of transistors has resulted in increased power consumption in the devices. As device dimensions decrease, power consumption becomes a more critical concern. This trend will likely continue, as the complexity of ICs increases.

To help optimize usage of IC resources and to generally come up with more optimal designs, IC providers seek to provide users and designers with better power models for the various resources present. Conventional power models have focused on the cell or block levels. In other words, they do not attempt to model the power behavior of the internal circuitry of a block to a relatively significant level. This approach, however, tends to over- or under-estimate power consumption of a given block or circuit. A need therefore exists for better power models for circuitry within ICs, such as programmable logic and programmable interconnect within PLDs.

SUMMARY

The disclosed novel concepts relate to apparatus and methods for improved modeling power characteristics of electronic circuitry in ICs, such as circuitry within PLDs. The inventive concepts contemplate modeling of static power consumption or dissipation, dynamic power consumption or dissipation, or both, of various circuitry within such ICs.

One aspect of the inventive concepts relates to methods of estimating power consumption of part or all of an IC, such as a PLD. In one embodiment, a method of estimating power consumption of a circuit in an IC includes decomposing the IC into a plurality of overlapping blocks. Each block in the plurality of blocks includes a portion of the circuitry in the IC. The method further includes estimating power consumption of each block in the plurality of blocks, and estimating power consumption of the IC based on the power consumption of the plurality of blocks.

Another aspect of the invention relates to a system for providing a model of power consumption of part or all of an IC, where the system includes a computer configured to perform the method of power modeling described above. Yet another aspect of the inventive concepts pertains to computer program products that include computer applications adapted for processing by a computer to estimate power consumption of a part of all of an IC. The computer applications cause the computer to perform the method of power modeling described above.

BRIEF DESCRIPTION OF THE DRAWINGS

The appended drawings illustrate only exemplary embodiments of the invention and therefore should not be considered or construed as limiting its scope. Persons of ordinary skill in the art who have the benefit of the description of the invention appreciate that the disclosed inventive concepts lend themselves to other equally effective embodiments. In the drawings, the same numeral designators used in more than one drawing denote the same, similar, or equivalent functionality, components, or blocks.

FIG. 10 shows a table for modeling a multiplexer tree static power consumption according to an exemplary embodiment of the invention.

DETAILED DESCRIPTION

The inventive concepts contemplate apparatus and associated methods for improved power models for various circuitry in ICs such as PLDs. One feature of the inventive concepts relates to computer-aided design (CAD) flows that model and estimate power consumption of various PLD blocks. Other features of the invention relate to estimating and modeling static and dynamic power levels of PLD blocks, such as programmable logic and programmable interconnect.

This disclosure relates to two aspect of power consumption in electronic circuits: static power consumption, and dynamic power consumption. Those terms are understood by persons of ordinary skill in the art who have the benefit of the description of the invention. Briefly, static power consumption refers to power consumed by a device when no signal activity is present in the device (i.e., largely power consumption because of leakage current). Dynamic power consumption, on the other hand, refers to power consumption caused by signal activity (e.g., an input signal changing state). Dynamic power consumption is a function of the number of nodes in the circuit that are transitioning, and the rate of those transitions.

Figure 1:
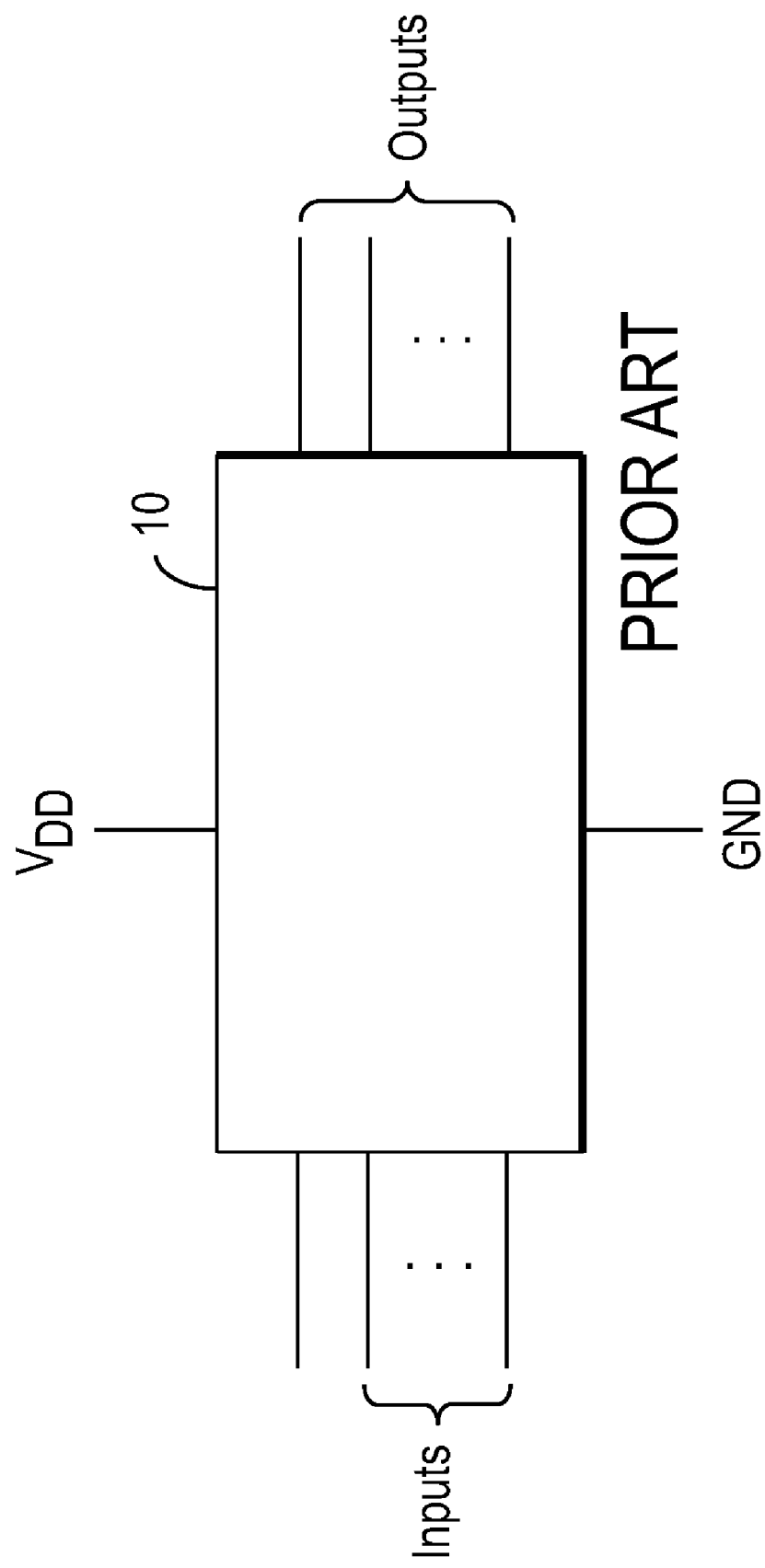
FIG. 1 shows a conventional approach to modeling of power consumption in a block of circuitry.

FIG. 1 helps to illustrate a conventional approach to modeling of power consumption in a block of circuitry. The conventional approach to power modeling of a block 10 of circuitry focuses on its terminal characteristics. More specifically, the power model takes into account the voltages and currents at the terminals of the block 10, and fails to take into account the nature of the circuitry within block 10. An example of such a power model constitutes the Liberty models (provided by Synopsys, Inc.), well known to persons of ordinary skill in the art.

Practical conventional power models suffer from relative lack of accuracy. For example, a power model according to the conventional approach might produce an estimate that deviate from the actual power consumption by, say, 50%. In contrast, an approach to power modeling according to the invention takes into account not only the terminal characteristics (voltage, current) of the block of circuitry, but also the nature of the circuitry that resides within it.

Figure 2:
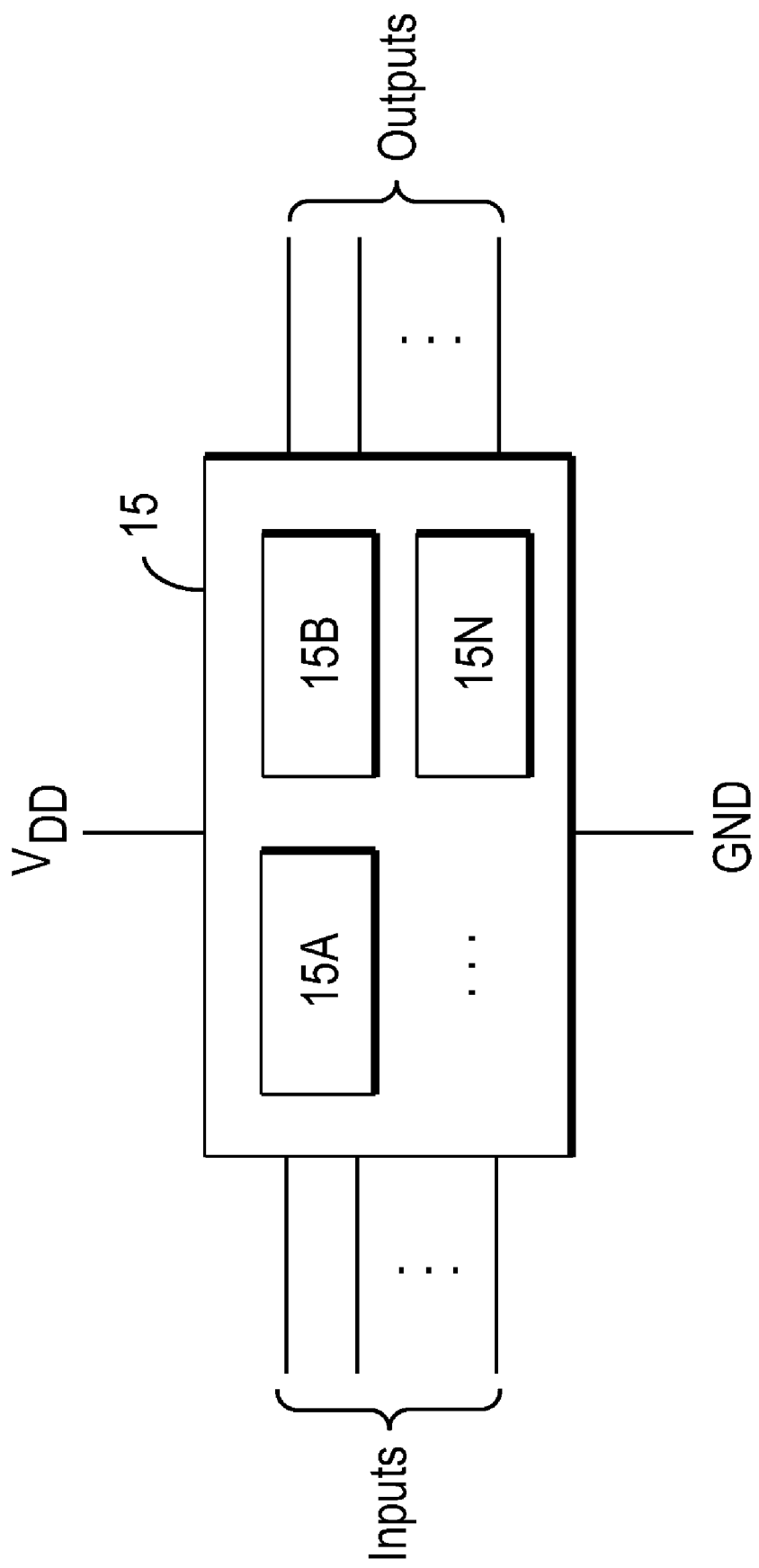
FIG. 2 illustrates an approach to modeling power consumption or dissipation according to an exemplary embodiment of the invention.

FIG. 2 helps to illustrate an approach to modeling power consumption or dissipation according to an exemplary embodiment of the invention. Block 15 in FIG. 2 may include one or more sub-blocks, labeled as 15A-15N. As described below in detail, in addition to the terminal characteristics of block 15, the power model takes into account power consumption characteristics of sub-blocks 15A. The resulting models have relatively high accuracy, for example, the estimated power consumption or dissipation levels come within 10% of the actual values.

Figure 3:
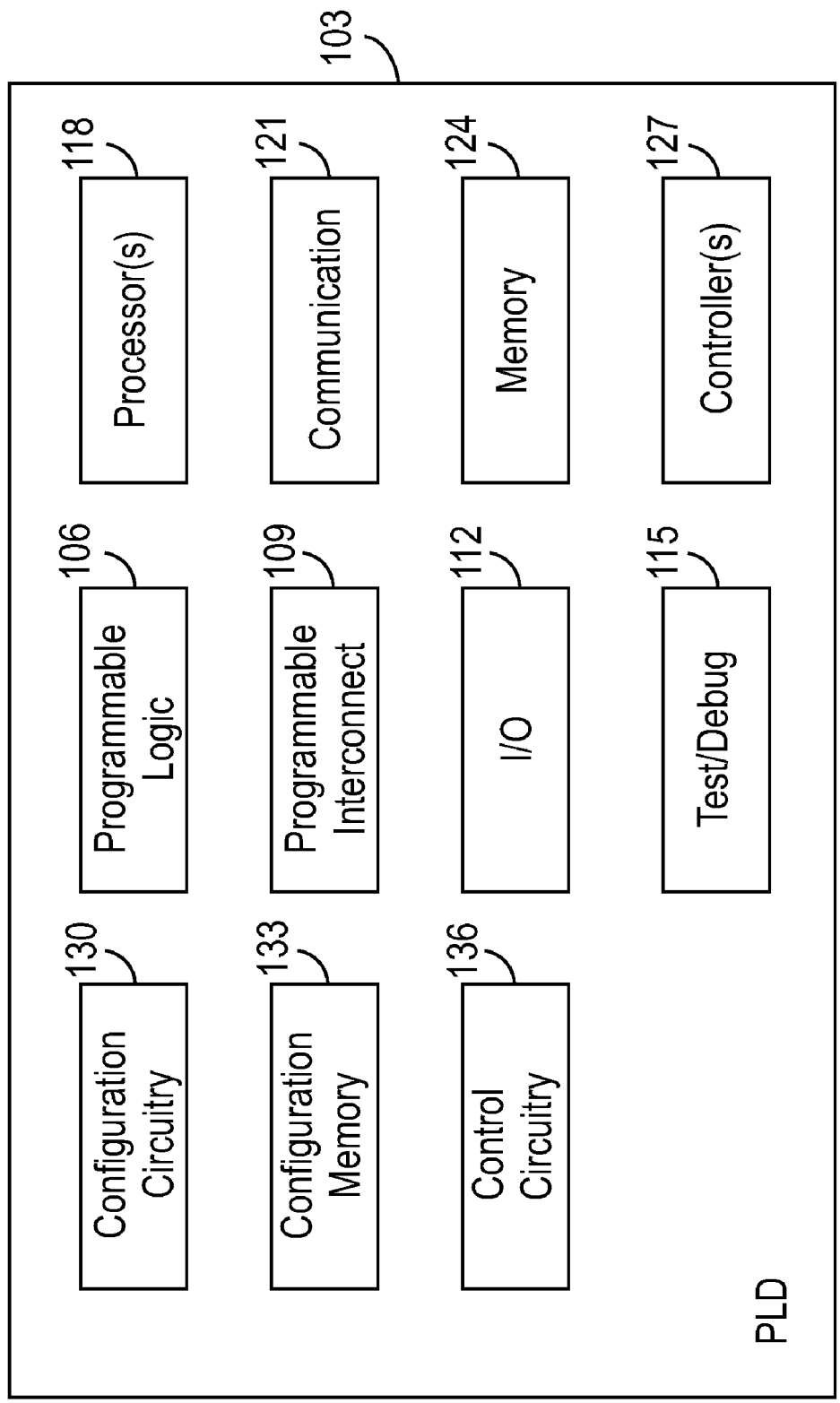
FIG. 3 depicts a general block diagram of a PLD according to an illustrative embodiment of the invention.

Generally speaking, block 15 may exemplify any of the blocks or circuits within a PLD. FIG. 3 shows a general block diagram of a PLD 103 suitable for power modeling according to an illustrative embodiment of the invention. PLD 103 includes configuration circuitry 130, configuration memory (CRAM) 133, control circuitry 136, programmable logic 106, programmable interconnect 109, and I/O circuitry 112. In addition, PLD 103 may include test/debug circuitry 115, one or more processors 118, one or more communication circuitry 121, one or more memories 124, one or more controllers 127, as desired.

Note that the figure shows a simplified block diagram of PLD 103. Thus, PLD 103 may include other blocks and circuitry, as persons of ordinary skill in the art understand. Examples of such circuitry include clock generation and distribution circuits, redundancy circuits, and the like. Furthermore, PLD 103 may include, analog circuitry, other digital circuitry, and/or mixed-mode circuitry, as desired.

Programmable logic 106 includes blocks of configurable or programmable logic circuitry, such as look-up tables (LUTs), product-term logic, multiplexers (MUXs), logic gates, registers, memory, and the like. Programmable interconnect 109 couples to programmable logic 106 and provides configurable interconnects (coupling mechanisms) between various blocks within programmable logic 106 and other circuitry within or outside PLD 103.

Control circuitry 136 controls various operations within PLD 103. Under the supervision of control circuitry 136, PLD configuration circuitry 130 uses configuration data (which it obtains from an external source, such as a storage device, a host, etc.) to program or configure the functionality of PLD 103. Configuration data are typically used to store information in CRAM 133. The contents of CRAM 133 determine the functionality of various blocks of PLD 103, such as programmable logic 106 and programmable interconnect 109.

I/O circuitry 112 may constitute a wide variety of I/O devices or circuits, as persons of ordinary skill in the art who have the benefit of the description of the invention understand. I/O circuitry 112 may couple to various parts of PLD 103, for example, programmable logic 106 and programmable interconnect 109. I/O circuitry 112 provides a mechanism and circuitry for various blocks within PLD 103 to communicate with external circuitry or devices.

Test/debug circuitry 115 facilitates the testing and troubleshooting of various blocks and circuits within PLD 103. Test/debug circuitry 115 may include a variety of blocks or circuits known to persons of ordinary skill in the art who have the benefit of the description of the invention. For example, test/debug circuitry 115 may include circuits for performing tests after PLD 103 powers up or resets, as desired. Test/debug circuitry 115 may also include coding and parity circuits, as desired.

PLD 103 may include one or more processors 118. Processor 118 may couple to other blocks and circuits within PLD 103. Processor 118 may receive data and information from circuits within or external to PLD 103 and process the information in a wide variety of ways, as persons skilled in the art with the benefit of the description of the invention appreciate. One or more of processor(s) 118 may constitute a digital signal processor (DSP). DSPs allow performing a wide variety of signal processing tasks, such as compression, decompression, audio processing, video processing, filtering, and the like, as desired.

PLD 103 may also include one or more communication circuits 121. Communication circuit(s) 121 may facilitate data and information exchange between various circuits within PLD 103 and circuits external to PLD 103, as persons of ordinary skill in the art who have the benefit of the description of the invention understand.

PLD 103 may further include one or more memories 124 and one or more controller(s) 127. Memory 124 allows the storage of various data and information (such as user-data, intermediate results, calculation results, etc.) within PLD 103. Memory 124 may have a granular or block form, as desired. Controller 127 allows interfacing to, and controlling the operation and various functions of circuitry outside the PLD. For example, controller 127 may constitute a memory controller that interfaces to and controls an external synchronous dynamic random access memory (SDRAM), as desired.

One aspect of the power modeling according to the inventive concepts relates to techniques, algorithms, or methods of modeling power consumption or dissipation. One may include such techniques, algorithms, or methods in PLD design software in order to provide improved power modeling of various PLD circuits and blocks, as desired.

Figure 4:
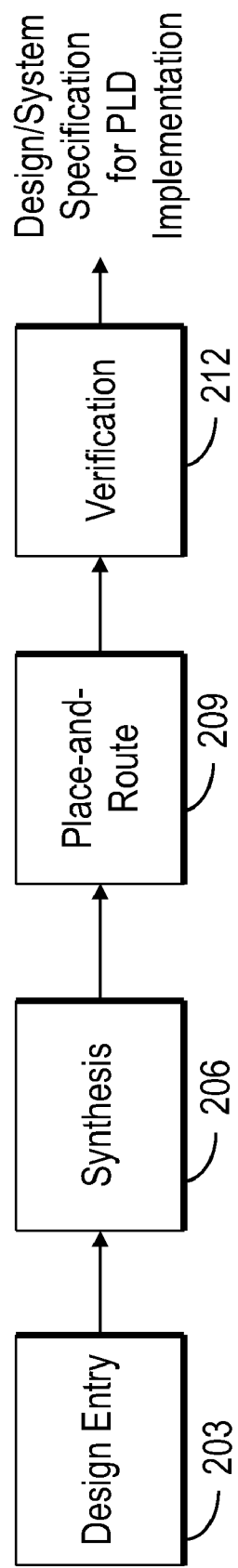
FIG. 4 shows various software modules that PLD computer-aided design (CAD) software according to illustrative embodiments of the invention uses.

FIG. 4 depicts various software modules that PLD computer-aided design (CAD) software according to illustrative embodiments of the invention uses. The modules include design-entry module 203, synthesis module 206, place-and-route module 209, and verification module 212. The following description provides a simplified explanation of the operation of each module, followed by a description of CAD techniques to reduce or minimize power consumption in PLDs.

Design-entry module 203 allows the editing of various design description files using graphical or textual descriptions of a circuit or its behavior, such as schematics, hardware description languages (HDL), or waveforms, as desired. The user may generate the design files by using design-entry module 203 or by using a variety of electronic design automation (EDA) or CAD tools (such as industry-standard EDA tools), as desired. The user may enter the design in a graphic format, a waveform-based format, a schematic format, in a text or binary format, or as a combination of those formats, as desired.

Synthesis module 206 accepts the output of design-entry module 203. Based on the user-provided design, synthesis module 206 generates appropriate logic circuitry that realizes the user-provided design. One or more PLDs (not shown explicitly) implement the synthesized overall design or system. Synthesis module 206 may also generate any glue logic that allows integration and proper operation and interfacing of various modules in the user's designs. For example, synthesis module 206 provides appropriate hardware so that an output of one block properly interfaces with an input of another block. Synthesis module 206 may provide appropriate hardware so as to meet the specifications of each of the modules in the overall design or system.

Furthermore, synthesis module 206 may include algorithms and routines for optimizing the synthesized design. Through optimization, synthesis module 206 seeks to more efficiently use the resources of the one or more PLDs that implement the overall design or system. Synthesis module 206 provides its output to place-and-route module 209. One may include some or all of the power modeling techniques, algorithms, or methods in synthesis module 206, as desired, and as persons of ordinary skill in the art who have the benefit of the description of the invention understand.

Place-and-route module 209 uses the designer's timing specifications to perform optimal logic mapping and placement. The logic mapping and placement determine the use of routing resources within the PLD(s). In other words, by use of particular programmable interconnects with the PLD(s) for certain parts of the design, place-and-route module 209 helps optimize the performance of the overall design or system. By proper use of PLD routing resources, place-and-route module 209 helps to meet the critical timing paths of the overall design or system.

Place-and-route module 209 optimizes the critical timing paths to help provide timing closure faster in a manner known to persons of ordinary skill in the art with the benefit of the description of the invention. As a result, the overall design or system can achieve faster performance (i.e., operate at a higher clock rate or have higher throughput). Place-and-route module 209 may use information about critical paths within the design or system to adjust or model power consumption of parts or all of the design or system, as desired. One may include some or all of the power modeling techniques, algorithms, or methods in synthesis module 206, as desired, and as persons of ordinary skill in the art who have the benefit of the description of the invention understand.

Verification module 212 performs simulation and verification of the design. The simulation and verification seek in part to verify that the design complies with the user's prescribed specifications. The simulation and verification also aim at detecting and correcting any design problems before prototyping the design. Thus, verification module 212 helps the user to reduce the overall cost and time-to-market of the overall design or system.

Verification module 212 may support and perform a variety of verification and simulation options, as desired. The options may include functional verification, test-bench generation, static timing analysis, timing simulation, hardware/software simulation, in-system verification, board-level timing analysis, signal integrity analysis and electro-magnetic compatibility (EMC), formal netlist verification, and power-consumption estimation, as desired.

Note that one may perform other or additional verification techniques as desired and as persons of ordinary skill in the art who have the benefit of the description of the invention understand. Verification of the design may also be performed at other phases in the flow, as appropriate, and as desired.

Generally speaking, PLDs include a relatively large amount of programmable logic 106 and programmable interconnect 109. Programmable logic 106 typically includes a number of LUTs, as described above, and as persons of ordinary skill in the art who have the benefit of the description of the invention understand.

Conventional models (see, for example, FIG. 1) typically rely on a power model per logic function, where the logic functions are typically gate level primitives, such as NAND gates. As noted, PLDs include relatively large functional blocks, such as LUTs, and programmable interconnect using multiplexers with relatively high fan-in (e.g., 15 to 30). Consequently, the enumeration of all possible combinations of input states leads to relatively high complexity in the power model. Further, due to the complexity of the block, there may be substantial static power or dynamic switching energy dissipated internally to the various blocks, and not visible as activity external to the pins of the block. The blocks contain significant amounts of logic state, encoded in CRAM.

Including the enumeration of all possible CRAM states leads to an exponential increase in the number of states to be considered. For example, a 6-input LUT can have a variation of more than 50:1 in the amount of dynamic power dissipated due to a transition on an input pin, depending on the pin and logic function encoded in the LUT. In particular, a transition on a LUT that toggles the last stage of multiplexers, and causes no output transition requires minimal power; a transition on a first stage of a LUT that is implementing an exclusive-OR (XOR) function toggles all of the internal nodes of the LUT and requires a large amount of power. Power models according to the invention overcome the shortcoming of conventional models.

Power models according to the inventive concepts compute the static and dynamic power dissipation using knowledge of the particular structural features of a PLD. The models compute the static and dynamic power of a PLD by decomposing the block level netlist and routing information into finer-grained blocks. The block level netlist represents the connectivity of logic resources and routing resources as visible to the user. Additional input to the CAD flow constitutes information on the static state and dynamic activity of each node in the block level netlist. This information is conventionally in the form of a static probability, giving the time-averaged logic value of each node, and dynamic activity, giving the rate of transitions per unit time on each node.

The models assume the existence of a higher level activity estimator that is capable of calculating the activity on the block level netlist. Methods to compute this information are known to persons of ordinary skill in the art. More complicated specifications of this information, including more complex functional or temporal relationships between signals are also possible, as desired, and as persons of ordinary skill in the art who have the benefit of the description of the invention understand.

As noted, a typical PLD includes a relatively large number of LUTs. Assume that the PLD uses a simple 3-input LUT, or 3-LUT as the logic structure (although the concepts described here apply to other types of LUTs, as persons of ordinary skill in the art who have the benefit of the description of the invention understand). The user level netlist contains the connectivity of a set of 3-LUTs and the associated 8-bit LUT mask, which is used to describe functionality. Conventional power models might treat the LUT as a 3-input function, which is tractable, but would have no behavior that depends upon the specific LUT mask. Viewing the LUT mask as logic inputs to a 11-input circuit (3 inputs plus 8 CRAM bits) would be possible by interpreting the circuit as a 11-input function. Doing so leads to a relatively large number (2048) of input combinations to enumerate. This approach would likely be infeasible with actual LUTs, which with today's technology contain 4 to 6 inputs and from 16 to 64 bits in the LUT mask.

Figure 5:
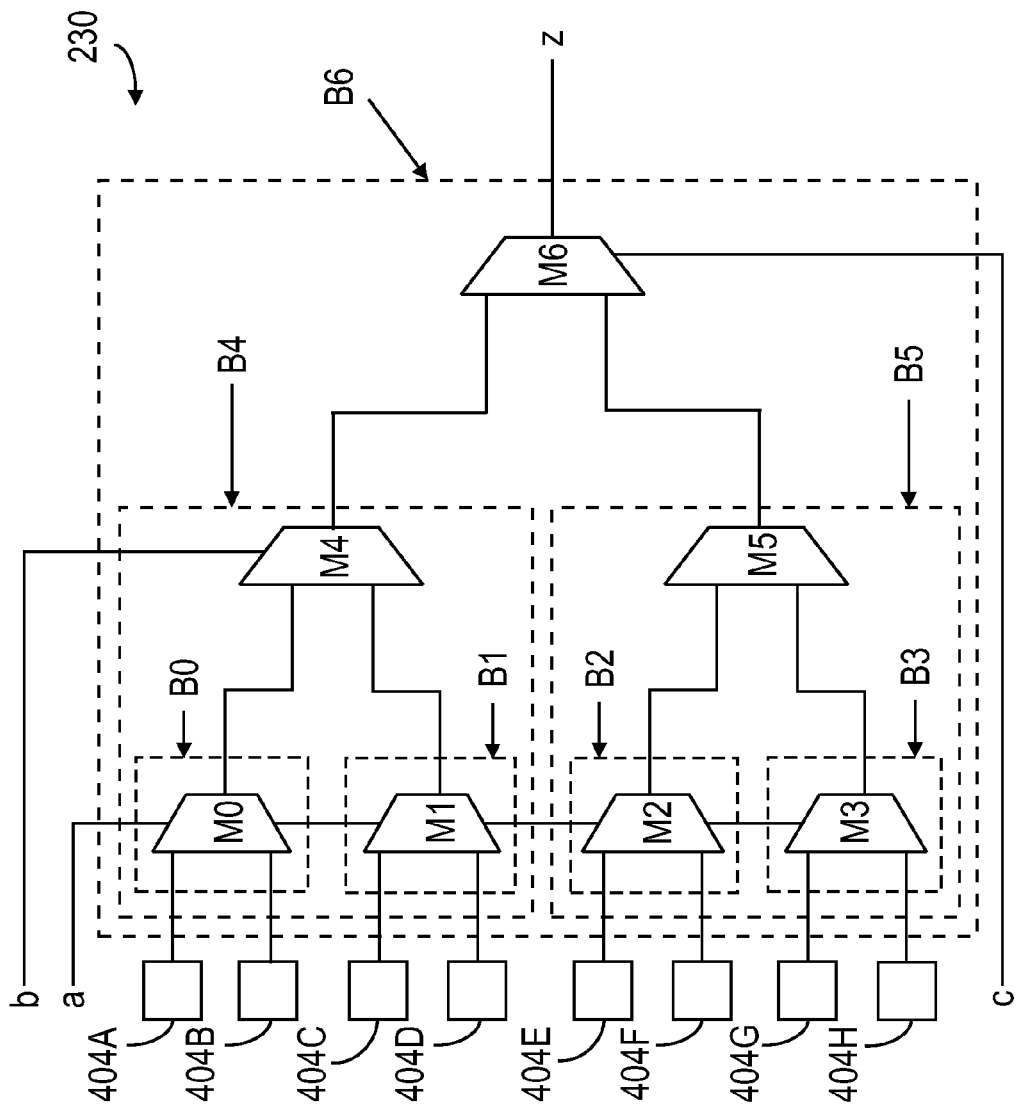
FIG. 5 illustrates a model of a look-up table (LUT) for use to model power consumption or dissipation according to an exemplary embodiment of the invention.

The approach according to the invention constructs a model of the internal structure of the LUT, which is composed of a collection of smaller blocks, each of a size that is amenable to an exhaustive power model. FIG. 5 shows a model of a LUT 230 for use to model power consumption or dissipation according to an exemplary embodiment of the invention. LUT 230 has three inputs, a, b, and c, and an output z. LUT 230 includes multiplexers (MUXs) M0-M6. CRAM cells 404A-404H drive inputs of MUXs M0-M3, respectively. Input a drives the select input of MUXs M0-M3, input b drives the select input of MUXs M4-M5, and input c drives the select input of MUX M6.

As a first step in modeling the power consumption of LUT 230, the inventive technique uses an activity estimator to compute activity at internal nodes inside each block of LUT 230. The activity is computed using a set of internal blocks. For the purpose of activity estimation, the internal blocks may overlap in extent. For example, each of the 4 first stage 2:1 multiplexers M0, M1, M2, and M3 may be an internal block, designated B0, B1, B2, and B3, respectively. Internal blocks B4 and B5 each include a total of 3 2:1 multiplexers, with B4 containing M0, M1, and M4, and B5 containing M2, M3, and M5. Finally, block B6 contains MUXs M0 through M6 inclusive.

Because 8 of the 11 inputs are constants (i.e., CRAM bits from CRAM cells 404A-404H), and the function of the LUT is known (a multiplexer tree), the static probability and activity may be calculated in time proportional to the number of CRAM bits. For the static probability, the expected output value is calculated by considering each possible combination of multiplexer select bits, computing the combined probability, and multiplying by the value of the respective CRAM bit that is selected by that combination, and summing the results.

The dynamic activity is computed by considering each multiplexer input, and all possible $2^{(N-1)}$ combinations of the other N−1 inputs, determining if a transition on this input, for the particular combination of the other N−1 inputs, causes an output transition and if so, adding in the static probability of the other N−1 input combinations multiplied by the dynamic activity for the input under consideration. The pseudo-code provided below illustrates the operations:

```
activity_out = 0;
    /* consider each input to the LUT */
    for (i = 0; i < N; i++)
        /* loop over all combinations of all inputs,
                but ignore i */
        for (iother = 0; iother < (1 << N); iother++)
            /* only consider case where input i is a 0
                in order to avoid double count */
            if (iother & (1 << i))
                continue;
            /* is output different for i=0 compared to i=1? */
            if (lutmask [iother] != lutmask [iother + (1 << i)]) {
                /* compute probability for inputs other
                        than i */
                pthis = 1;
                for (iprob = 0; iprob < N; iprob++) {
                        /* skip i */
                        if (iprob == i)
                                continue;
                        /* multiply by probability or
                                1-probability depending
                                on if iprob is 1 or 0 */
                        if (iother & (1 << iprob))
                                pthis *= prob [iprob];
                        else
                                pthis *= (1 − prob
                                        [iprob]);
                }
                activity_out += pthis * activity_in [i];
            }
        }
    }
```

In the pseudo-code above, activity_out represents the activity on the output of the LUT. The variable i is used to index through each input of the LUT of which there are N. The variable iother is used to index through all pairs of bits in the LUT mask, where each pair of bits is associated with a transition on the ith input, for some particular combination of the remaining N−1 input.

Figure 6A:
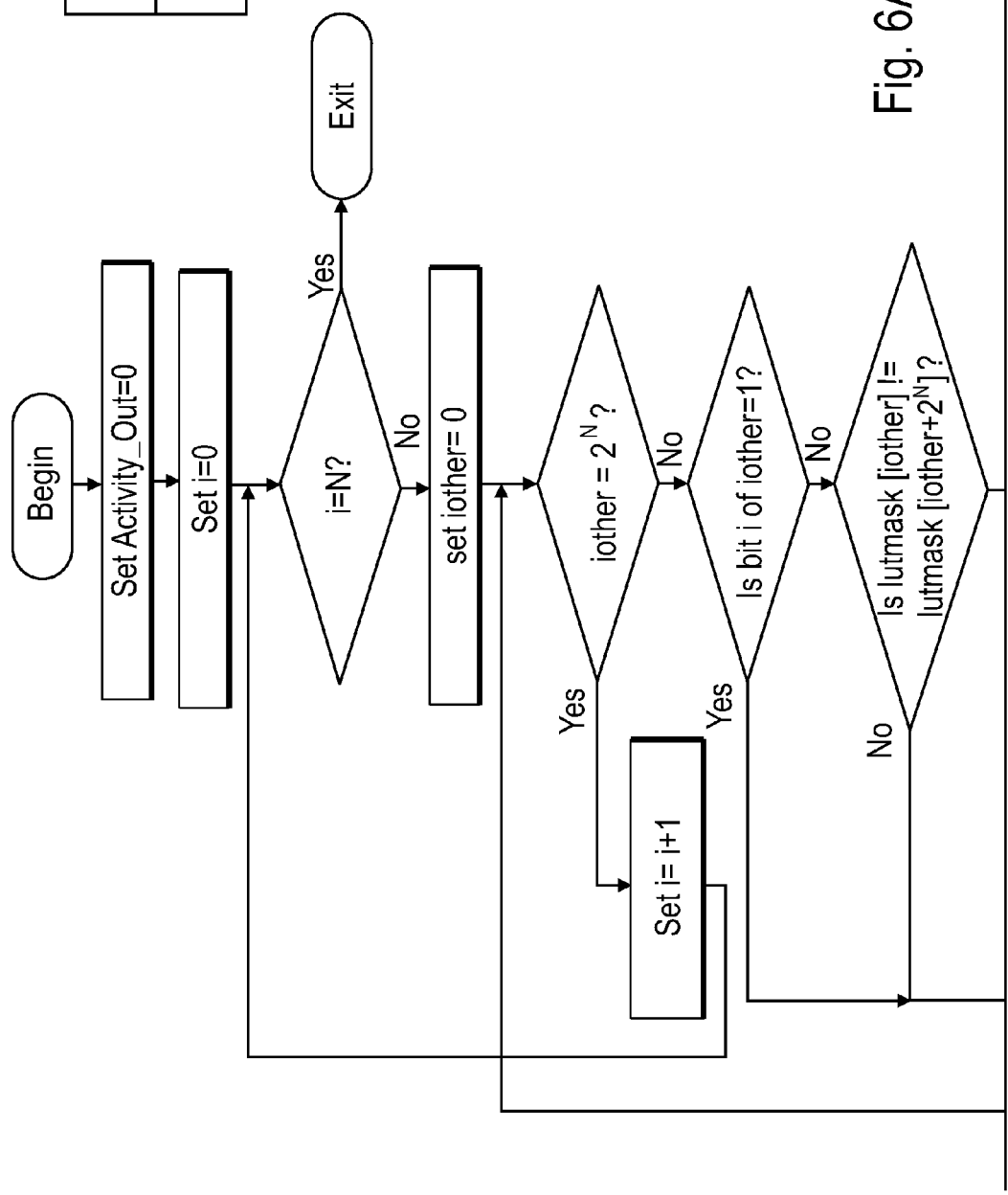
FIG. 6 depicts illustrates a flow-chart for a process according to an illustrative embodiment of the invention for providing a power model.
Figure 6B:
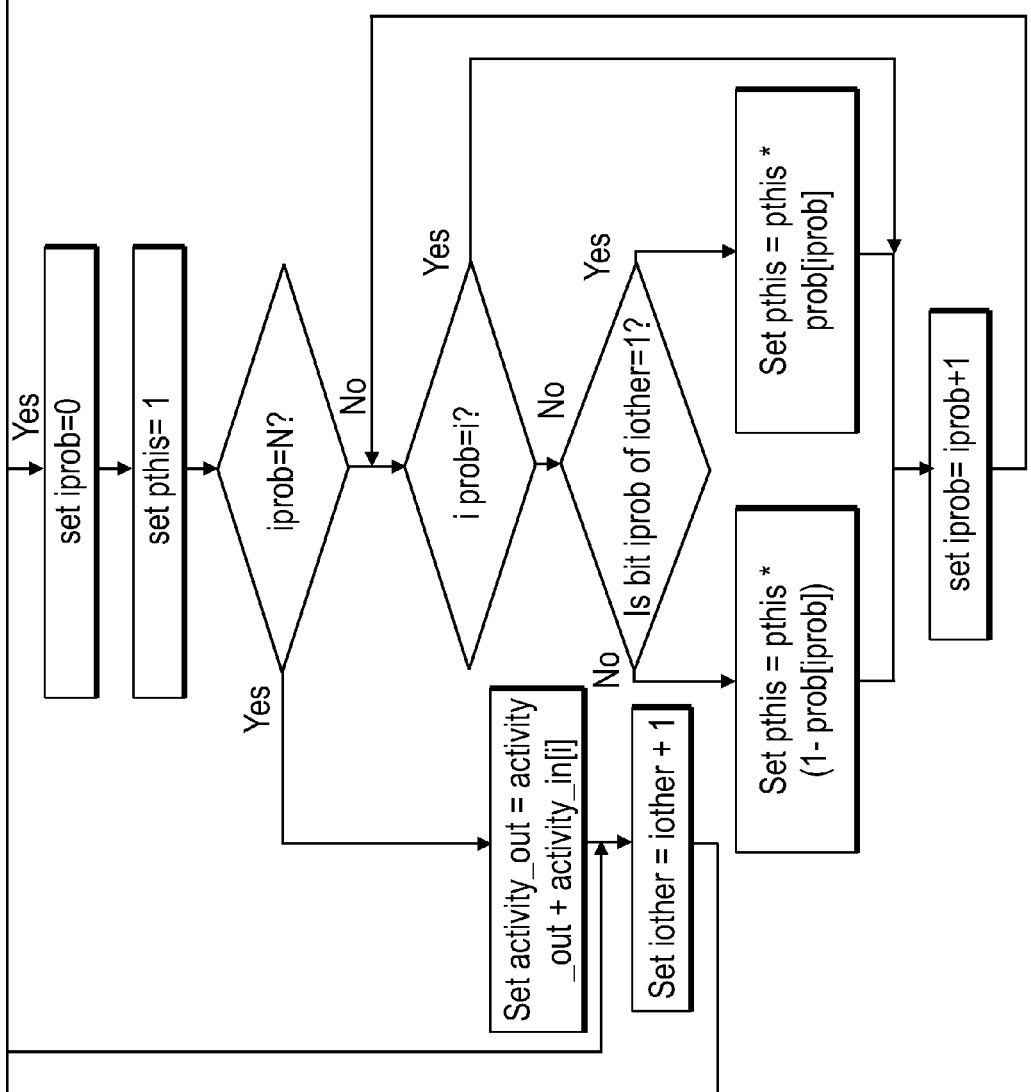

The LUT mask is represented by the variable lutmask. The variable iprob is used to index through all of the other input pins (excluding pin i) to compute the probability of a given combination of inputs excluding i. The variable pthis accumulates the probability of any given combination of the other inputs, prob[i] gives the static probability of each input, while activity_in[i] gives the dynamic activity of each input. FIG. 6 illustrates the operation of above pseudo-code above as a flow-chart or process flow.

As noted above, the model in FIG. 5 includes overlapping internal blocks for LUT 230. The purpose of overlapping internal blocks is to enable more accurate activity estimation that can capture re-convergent fan-out. For example input a affects the output of M4 via two different paths through M0 and M1. Note that one may apply the concept of overlapping blocks for power modeling generally to any IC, and that LUTs and PLDs constitute mere examples, as persons of ordinary skill in the art who have the benefit of the description of the invention understand. Note further that a set of nodes (of the IC circuitry) are internal to at least some blocks in the plurality of overlapping blocks in a user level netlist of the IC.

Considering the LUT mask 0101 in the top 4 CRAM bits (404A-404D), note that transitions on input a produce some static probability and activities at the outputs of M0 and M1. On the other hand, a transition on input b fails to cause activity on the output of M4. Computing the activity on M4 using the static and dynamic activities on the inputs to M4 would incorrectly produce activity on its output. Computing the activity on the output of B4 including all of the logic in its fan-in cone will produce a more accurate activity estimate, compared to modeling each of M0 through M6 independently. Thus, using overlapping internal blocks helps to improve the power model and to produce more accurate results.

Calculation of power consumption uses each identified internal block independently. The activity information is annotated onto the internal nodes of each logic block. The choice of simple internal blocks allows for an exhaustive enumeration of the static and dynamic power of each block. For example, each 2:1 MUX has 3 inputs (one select input and two data inputs), so modeling static power consumption for each of the 8 (i.e., $2^3$) possible input combinations is reasonable. Such a MUX has 12 possible transitions (one of each of the three inputs, plus four possible states for each distinct selected input), so power modeling entails enumeration of a relatively moderate number of cases.

Note that one may provide more extensive power models that take into account other characteristics of the circuitry, as desired, and as persons of ordinary skill in the art who have the benefit of the description of the invention understand. The choice of model complexity depends on factors such as desired features, available processing capacity and resources, and the complexity of the circuit to be modeled, as persons of ordinary skill in the art who have the benefit of the description of the invention understand. As an example, more extensive power models may include rise time dependence on the inputs and the outputs of the circuit and propagate this information between successive stages in the power model.

Figure 7:
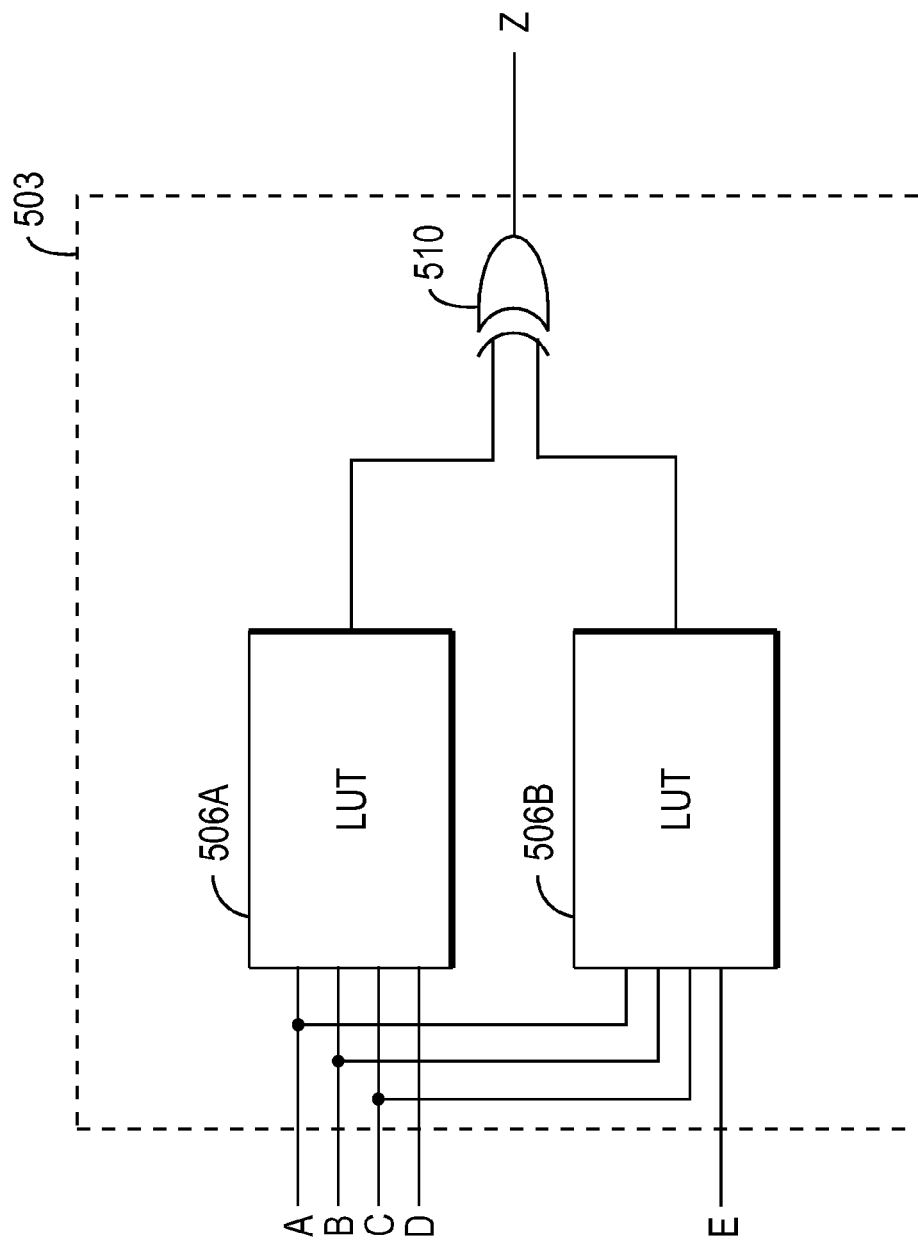
FIG. 7 shows a model of an adder used to model power consumption according to an exemplary embodiment of the invention.

Adders tend to be a relatively predominant block in programmable logic 106 of typical PLDs. One may model power consumption or dissipation of adders using the inventive concepts. FIG. 7 shows a model of an adder 503 used to model power consumption according to an exemplary embodiment of the invention. The input stage of adder 503 includes are two 4-LUTs (506A and 506B), with some overlapping input nodes. LUTs 506A and 506B feed the inputs of XOR gate 510. Note that FIG. 7 does not explicitly depict the carry chain.

Adder 503 accepts inputs A-E, computing two functions f1(a, b, c, d) and f2(a, b, c, e) before performing the final XOR operation on the results of f1 and f2. This arrangement can implement the additive functions of the form f1(a, b, c, d)+f2 (a, b, c, e). XOR gate 510 produces the sum, i.e., output signal z. The sum is produced from an XOR operation on the inputs of gate 510, and therefore there is a high degree of re-convergent fan-out from the LUT inputs to the adder output, z.

The power model according to the inventive concepts calculates the probability and activity for the sum output node z, considering the entire cone of logic back to the inputs of adder 503, thus providing better accuracy. Note that LUTs 506A and 506B share a total of 5 unique inputs and feed a dedicated adder cell (XOR gate 510). It is therefore advantageous to consider the entire block comprising the two 4-LUTs and gate 510 as a single block for the purpose of activity estimation in order to obtain the most accurate activity at the output of the adder.

One may apply the inventive concepts to modeling power consumption in PLDs' routing circuitry. Routing power models according to the invention also rely on decomposition of each routing resource into smaller internal blocks, taking advantage of a particular symmetry of routing multiplexers that allows exhaustive enumeration of the terminal states of the blocks with lower complexity.

Figure 8:
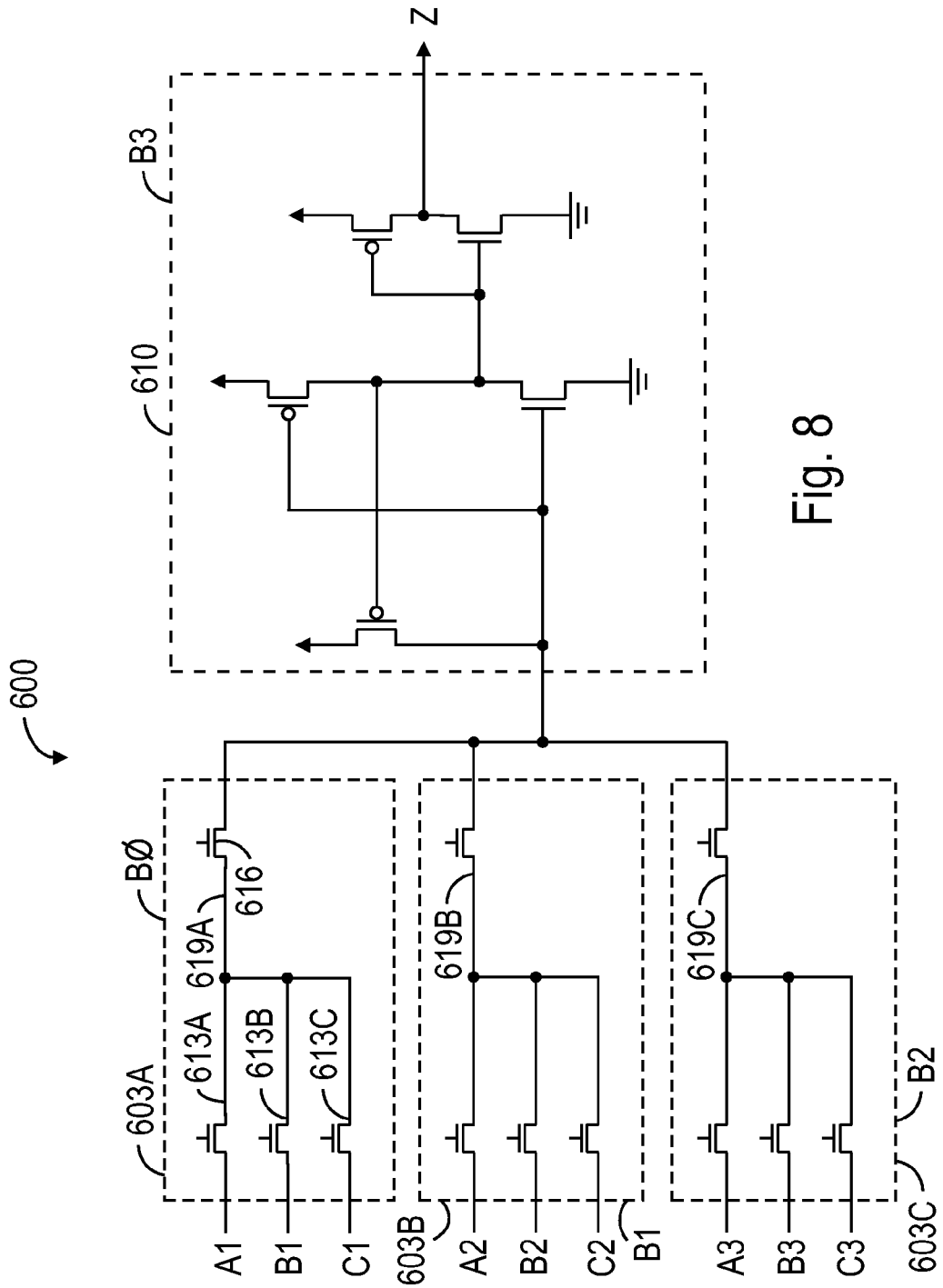
FIG. 8 illustrates a routing multiplexer and driver (driver input multiplexer, or DIM) used for power modeling according to an exemplary embodiment of the invention.

FIG. 8 illustrates a routing multiplexer and driver (DIM) 600 used for power modeling according to an exemplary embodiment of the invention. DIM 600 constitutes a 9:1 MUX. The 9:1 MUX has three MUX stages 603A-603C, respectively, and a driver stage 610. The structure and function of MUXs 603A-603C and driver stage 610 are known by persons of ordinary skill in the art who have the benefit of the description of the invention.

Each of MUX stages 603A-603C is arranged as cascaded first and second stages. For example, MUX 603A is arranged as a first stage MUX that includes transistors 613A-613C, coupled to a second stage that includes transistor 616. MUX stages 603B-603C have a similar structure, as FIG. 8 shows. Three CRAM bits (not shown explicitly) control the three transistors in the first stage of each of MUXs 603A-603C, respectively. For example, three CRAM bits control transistors 613A-613C, respectively. Another CRAM bit (not shown explicitly) controls transistor 616. A similar arrangement applies to MUXs 603B-603C, as persons of ordinary skill in the art who have the benefit of the description of the invention understand.

If a multiplexer is being used to route a signal, then one CRAM bit in each of the first and second stages of one of MUXs 603A-603C will be set to a '1' and the remainder will be set to '0.' If the multiplexer is not being used then all CRAM bits will be set to '0.' A particular issue in the decomposition of a routing multiplexer into internal blocks arises from the case in which the multiplexer is not used. In this case, the state of internal nodes between the first and second stages (i.e., nodes 619A-619C, respectively) is not well defined, and can vary from near ground to near the supply voltage. The voltages at the internal nodes 619A-619C depends on the values of the inputs of the first stage and the value on the output of the second stage. Conventionally an unused multiplexer will be forced to a logic '1' on the output of the second stage multiplexer during initialization of the PLD's circuitry, as persons of ordinary skill in the art who have the benefit of the description of the invention understand.

Figure 9:
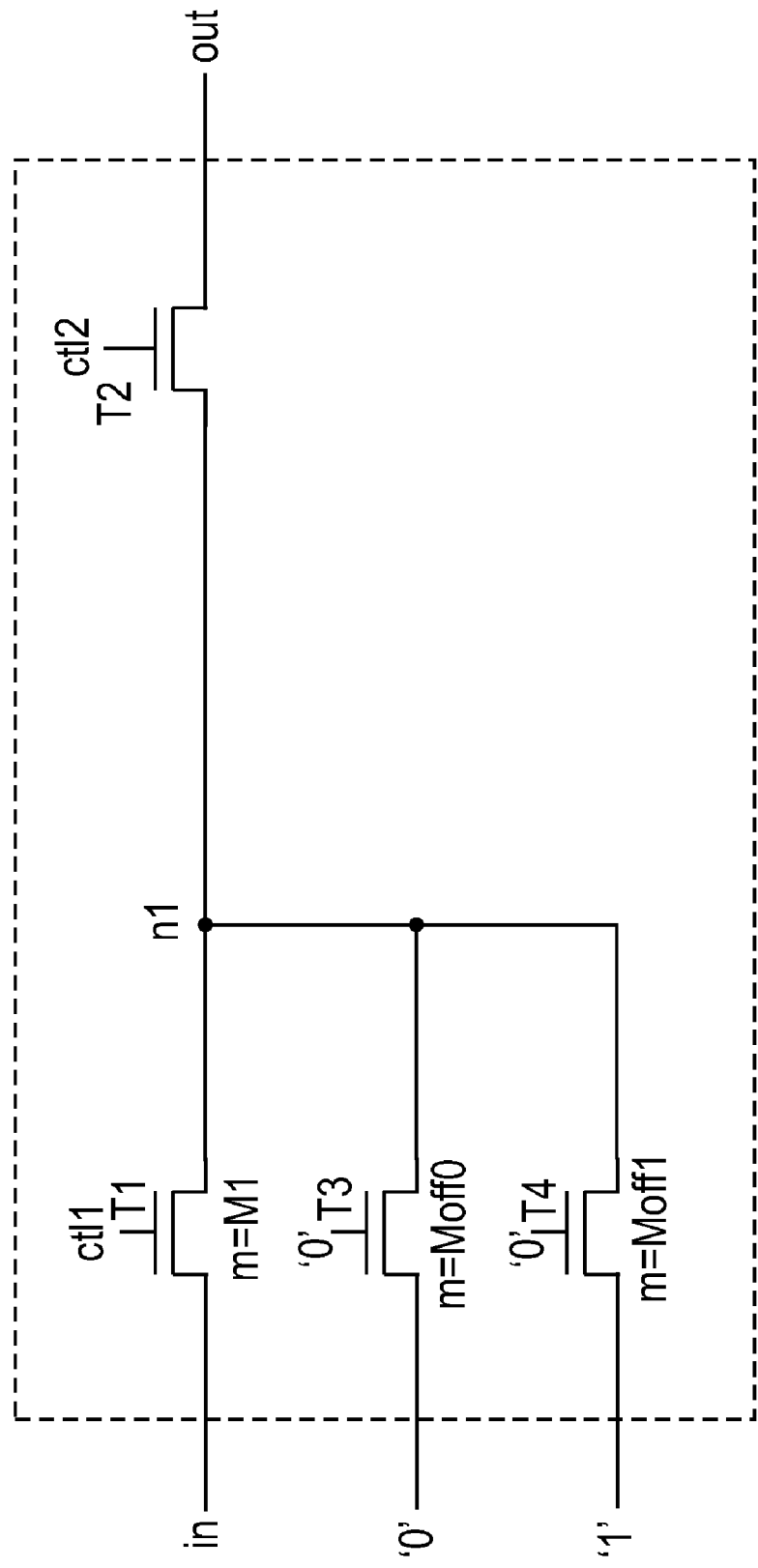
FIG. 9 depicts a model for estimating power dissipation in PLD routing circuitry according to an exemplary embodiment of the invention.

The inventive concepts contemplate models for the estimation of static and dynamic power consumption in the PLD's routing circuitry. For static power consumption, it is advantageous to break the multiplexer into 4 internal blocks as illustrated (i.e., blocks B0-B3). Instead of showing all transistors explicitly, transistors with identical (or similar or nearly identical) terminal voltages may be grouped together, using the m-factor-multiplier that is provided in certain CAD tools (e.g., HSPICE) to represent the number of transistors with identical (or similar or nearly identical) voltages, as persons of ordinary skill in the art who have the benefit of the description of the invention understand. FIG. 9 shows a model in which such transistors are grouped together and represented using a multiplier factor (m).

A DIM block is described by two attributes: used and enabled. The DIM is used if that particular DIM is being used to select and propagate a signal from one of its inputs to one of its outputs. In other words, the DIM is used if one of the first stage MUX CRAM bits is '1,' and one of the second stage MUX CRAM bits is '1.' With respect to a particular MUX block, because the first stage CRAM cells are connected in parallel, one of the first stage multiplexer transistors will be enabled (i.e., turned ON) in each of the blocks, but the second stage multiplexer may or may not be enabled.

The first stage multiplexer block is referred to as enabled if the second stage transistor is enabled (i.e., turned ON), and not enabled if the second stage transistor is disabled (i.e., turned OFF). If the DIM is not used, then all of the transistors are disabled (i.e., all transistors are OFF, and no transistor conducts).

Given that terminology, referring to FIG. 9, the value of M1 represents whether the routing DIM is used. Thus, M1=1 if the DIM is used, and M1=0 if it is not used. The values of Moff0 and Moff1 represent, respectively, the number of inputs to the multiplexer block that are driven by a logic '0' signal and by a logic '1' signal. Note that, if there are N inputs to the first stage multiplexer, one may express the relationship among M1, Moff0, and Moff1 as:

$$M1 + Moff0 + Moff1 = N.$$

All of the terminal voltages on each of these blocks is a well-defined logic '0' or logic '1.' As a result, one may make a complete enumeration of all of combinations of the respective terminal voltages. In general, for an N:1 first stage, there would be 2*N+1 terminals on the block (considering both the inputs and output, as well as the states of the CRAM bits). Consequently, one would have a total of $2^{(2*N+1)}$ combinations to enumerate.

Taking advantage of the method of use of the multiplexer, and the fact that all of the N first stage transistors are conventionally identical, however, one may characterize the block by a much smaller set of data. (The CRAM power consumption is assumed to be computed separately by summing the power of each CRAM cell, considering its logic state.) In particular, the fact that either 0 or 1 of the CRAM cells will contain a '1,' and that the multiplexer will be either passing no signal, or one of the signals, combined with the symmetry of the various inputs to the multiplexer leads to a decrease in the number of distinct inputs combinations to consider.

Referring to FIG. 9, with respect to a particular internal block in the routing fabric, the MUX in the internal block may have one of three operating modes: unused; used, but disabled; and used and enabled. When the MUX is not used, all of the CRAM bits are set to '0,' so ctl1=0, and ctl2=0. In this situation, it is possible to characterize each internal MUX block by a single value i, representing the number of logic '1's on the first stage, which implies (N-i) logic '0's, where i ranges from 0 to N.

Another datum characterizes whether the output of the multiplexer is held at a logic '0' or at logic '1.' Referring to FIG. 9, M1=0, Moff0=N-i, and Moff1=i. The state of input in is irrelevant, and one considers all cases of out=0 and out=1, for i=0 to i=N. Note that it is likely that the second stage pass transistor (e.g., transistor 616 in MUX 603A in FIG. 8) is identical to the first stage pass transistors (e.g., transistors 613A-613C in MUX 603A). In such a situation, it is possible to further reduce the enumeration to i logic '1's on the complete set of terminals, and (N+1-i) logic '0's.

In the second case (used, but disabled), one input is enabled through the first stage MUX, but the second stage is disabled. In this case, one considers all 4 combinations of the input and output nodes being '0' or '1.' In each of these cases, there may be i other '1's and N-i-1 '0's on the other inputs to the MUX's first stage. In this case, ctl1='1,' ctl2='0,' M1=1, Moff1=i, and Moff0=N-i-1. Note further that one also considers the cases where in='0,' in='1,' out='0,' and out='1' for all values of i from 0 to N-1.

In the last case, because the MUX's second stage pass transistor is enabled, the output from the second stage is the same as the enabled input to the first stage. As a result, there are two distinct combinations of the input to consider, i.e., logic '0,' and logic '1.' In each of these combinations, one again considers all possible values of i occurrences of '1's on the other inputs, and N-1-i occurrences of '0's on the other inputs to the first stage. In this situation, ctl1='1,' ctl2='1,' M1=1, Moff1=i, and Moff0=N-i-1. Note further that one also considers the cases where in='0,' in='1,' out='0,' and out='1' for all values of i from 0 to N-1.

As a result of the above observations, note that there are a total of 8 unique cases to consider for the leakage power of a routing MUX, each of which includes a table giving the leakage power for i occurrences of '1' inputs on the unused inputs of the MUX. FIG. 10 enumerates those cases. Note that, for each case, an array of values giving static power for all relevant values of i is generated.

Referring to FIG. 8, note that the remaining part of the DIM constitutes the CRAM cells (not shown explicitly) and driver 610. Each of them is defined by two states, i.e., either logic '0' or '1.' The power model may be defined by providing the respective power consumption of the CRAM cells and driver 610 in each of those two states.

Static power is computed by summing the power for each of the components or blocks across each possible combination of previously computed static probabilities for each input. For N terminals, there are potentially $2^N$ combinations of inputs to be considered, and a joint probability for each is computed. A simplification similar to the multiplexer model above reduces the computational complexity from exponential to quadratic. Considering the N inputs connected to the disabled input terminals of the MUX, one computes the probability of i of these being set to '1' for all values of i, for all values of i in the range of 0 to N, inclusive.

The computation may be performed with a recurrence relationship. More specifically, define p[i,j] as the probability that i out of the first j input signals are '1.' Assume that s[i] is the static probability that the ith signal is a logic '1.' One may express the recurrence relationship as:

$$p[0,0]=1,$$

$$p[-1,j]=0, \text{ and}$$

$$p[i,j+1]=(1-s[i])*p[i,j]+s[i]*p[i-1,j].$$

The recurrence relationships reflect the fact that i out of (j+1) signals will be '1' if the ith signal is a '0,' and i out of the j signals are '1,' or the ith signal is '1' and (i-1) out of the j signals are '1.' The computation of all p [i, N] may be performed in quadratic time, iterating over i and j, and the sum of {p [i, N]*power(i)}, where power(i) represents the static power for a configuration with i occurrences of logic '1's in that mode. The computation is therefore performed efficiently to determine the total static power of the MUX. Note that one performs the computation for all relevant combinations of the active input and output nodes according to the table in FIG. 10, and summed with weights according to the respective probabilities of each node's activity.

The dynamic power model is provided as follows: For any given signal attached to the input of the MUX, the MUX can be viewed as being in one of the three operating modes, as described above. An amount of power consumed per transition is defined for a transition on each input, depending on which of the three modes the MUX occupies. In other words, for each type of MUX, and each unique power per input, there are 3 power numbers that provide the amount of consumed power per transition, depending on whether (i) the MUX is unused; (ii) passing the input signal through the first stage, but not through the second stage; or (iii) propagating the signal from an input to the output. With respect to DIM 610, one may model the entire DIM 610 as a single block for the purposes of estimating dynamic power consumption.

In order to model all of the components of the routing fabric, one also includes the power consumption of the CRAM cells (not shown explicitly in FIG. 8). Each CRAM cell has an output of either logic '0' or logic '1.' The contribution of CRAM cells to the overall power consumption may be obtained by summing up the appropriate power for each CRAM cell depending on its output value.

To model power consumption of a desired circuit using the inventive concepts, one typically uses a computer system that processes information relating to that circuit. For example, such a system or information handling device may run or process the CAD flow described above, as persons of ordinary skill in the art who have the benefit of the description of the invention understand.

Figure 11:
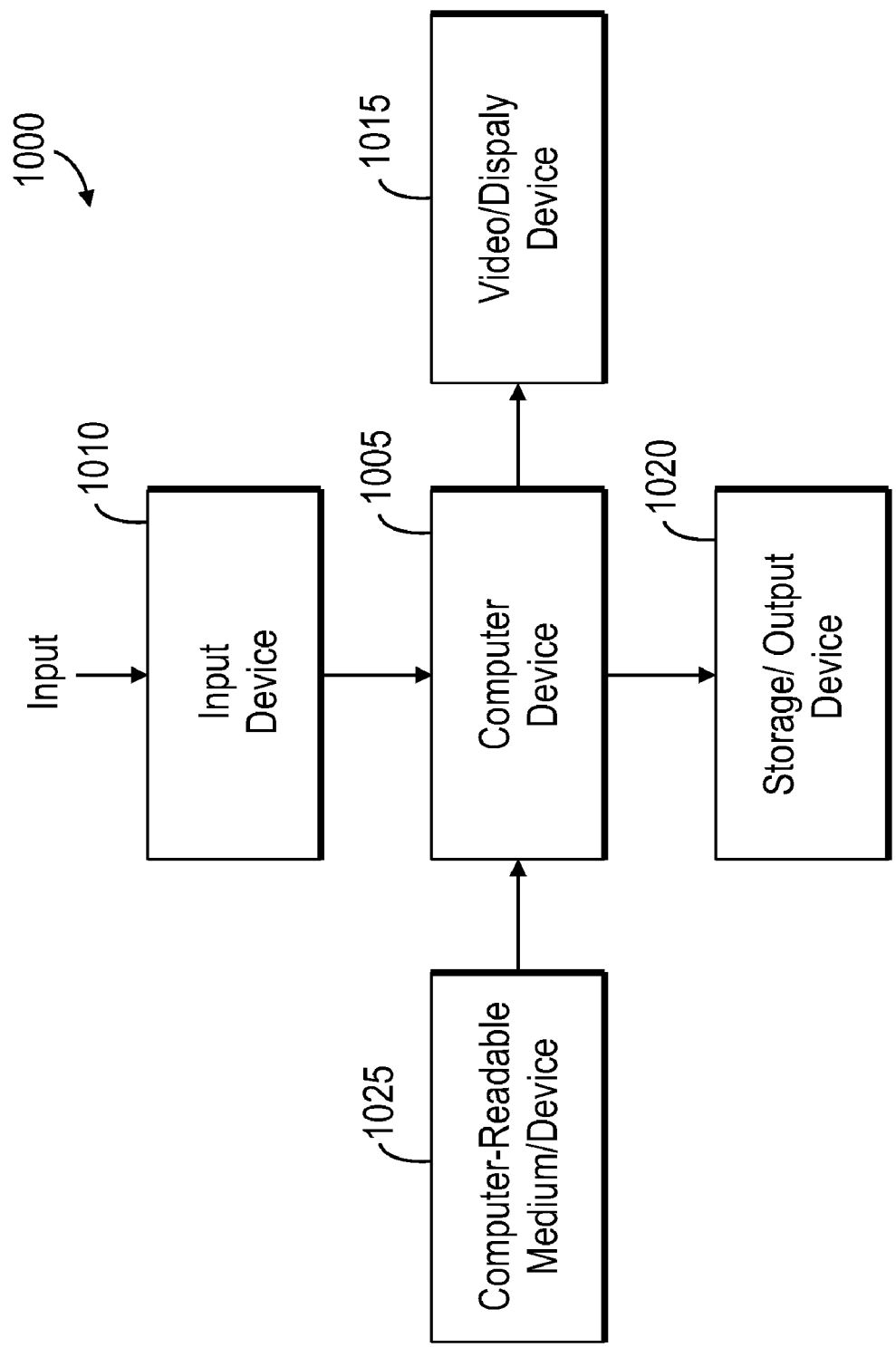
FIG. 11 illustrates a block diagram of a system for processing information (power modeling) according to the invention.

FIG. 11 shows a block diagram of a system for processing information (power modeling) according to the invention. System 1000 includes a computer device 1005, an input device 1010, a video/display device 1015, and a storage/ output device 1020, although one may include more than one of each of those devices, as desired.

The computer device 1005 couples to the input device 1010, the video/display device 1015, and the storage/output device 1020. The system 1000 may include more that one computer device 1005, for example, a set of associated computer devices or systems, as desired.

The system 1000 operates in association with input from a user. The user input typically causes the system 1000 to perform specific desired information-processing tasks, including circuit simulation. The system 1000 in part uses the computer device 1005 to perform those tasks. The computer device 1005 includes an information-processing circuitry, such as a central-processing unit (CPU), although one may use more than one CPU or information-processing circuitry, as persons skilled in the art would understand.

The input device 1010 receives input from the user and makes that input available to the computer device 1005 for processing. The user input may include data, instructions, or both, as desired. The input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to the computer device 1005. Similarly, the user operates the pointing device to provide cursor position or control information to the computer device 1005.

The video/display device 1015 displays visual images to the user. The visual images may include information about the operation of the computer device 1005, such as graphs, pictures, images, and text. The video/display device may constitute a computer monitor or display, a projection device, and the like, as persons of ordinary skill in the art would understand. If a system uses a touch-sensitive display, the display may also operate to provide user input to the computer device 1005.

The storage/output device 1020 allows the computer device 1005 to store information for additional processing or later retrieval (e.g., softcopy), to present information in various forms (e.g., hardcopy), or both. As an example, the storage/output device 1020 may constitute a magnetic, optical, or magneto-optical drive capable of storing information on a desired medium and in a desired format. As another example, the storage/output device 1020 may constitute a printer, plotter, or other output device to generate printed or plotted expressions of the information from the computer device 1005.

The computer-readable medium 1025 interrelates structurally and functionally to the computer device 1005. The computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by the computer-readable medium 1025, the functional descriptive material imparts functionality. The functional descriptive material interrelates to the computer-readable medium 1025.

Information structures within the functional descriptive material define structural and functional interrelations between the information structures and the computer-readable medium 1025 and/or other aspects of the system 1000. These interrelations permit the realization of the information structures' functionality. Moreover, within such functional descriptive material, computer programs define structural and functional interrelations between the computer programs and the computer-readable medium 1025 and other aspects of the system 1000. These interrelations permit the realization of the computer programs' functionality.

By way of illustration, the computer device 1005 reads, accesses, or copies functional descriptive material into a computer memory (not shown explicitly in the figure) of the computer device 1005. The computer device 1005 performs operations in response to the material present in the computer memory. The computer device 1005 may perform the operations of processing a computer application that causes the computer device 1005 to perform additional operations. Accordingly, the functional descriptive material exhibits a functional interrelation with the way the computer device 1005 executes processes and performs operations.

Furthermore, the computer-readable medium 1025 constitutes an apparatus from which the computer device 1005 may access computer information, programs, code, and/or applications. The computer device 1005 may process the information, programs, code, and/or applications that cause the computer device 1005 to perform additional operations.

Note that one may implement the computer-readable medium 1025 in a variety of ways, as persons of ordinary skill in the art would understand. For example, memory within the computer device 1005 may constitute a computer-readable medium 1025, as desired. Alternatively, the computer-readable medium 1025 may include a set of associated, interrelated, coupled (e.g., through conductors, fibers, etc.), or networked computer-readable media, for example, when the computer device 1005 receives the functional descriptive material from a network of computer devices or information-processing systems. Note that the computer device 1005 may receive the functional descriptive material from the computer-readable medium 1025, the network, or both, as desired.

Note that one may apply the inventive concepts effectively to various ICs that include ICs with programmable or configurable circuitry, known by other names in the art, as desired, and as persons skilled in the art with the benefit of the description of the invention understand. Such circuitry include, for example, devices known as complex programmable logic device (CPLD), programmable gate array (PGA), and field programmable gate array (FPGA).

Referring to the figures, persons of ordinary skill in the art will note that the various blocks shown may depict mainly the conceptual functions and signal flow. The actual circuit implementation may or may not contain separately identifiable hardware for the various functional blocks and may or may not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of the invention understand. Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only.

The forms of the invention shown and described should be taken as the presently preferred or illustrative embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

The invention claimed is:

1. A computer-implemented method of estimating power consumption of a circuit in an integrated circuit (IC), the method comprising:
   decomposing, using a computer, the circuit into a plurality of blocks of circuitry;
   estimating, using the computer, power consumption of each block in the plurality of blocks of circuitry; and
   estimating, using the computer, power consumption of the circuit based on terminal characteristics of the circuit and estimated power consumptions of the plurality of blocks of circuitry.

2. The method according to claim 1, wherein the circuit comprises a look-up table (LUT).

3. The method according to claim 2, wherein the look-up table (LUT) comprises a plurality of multiplexers (MUXs).

4. The method according to claim 3, wherein an input of at least one multiplexer (MUX) in the plurality of multiplexers (MUXs) couples to a configuration memory (CRAM).

5. The method according to claim 3, wherein at least one block in the plurality of blocks of circuitry includes a multiplexer (MUX) in the plurality of multiplexers (MUXs).

6. The method according to claim 1, wherein the integrated circuit (IC) comprises a programmable logic device (PLD).

7. The method according to claim 1, wherein the plurality of blocks of circuitry are overlapping.

8. A computer-implemented method of estimating power consumption of a circuit in an integrated circuit (IC), the method comprising:
   dividing the circuit into a plurality of blocks of circuitry by using a computer;
   estimating, using the computer, static signal probability within each block of circuitry in the plurality of blocks of circuitry;
   deriving, using the computer, a static power consumption of the circuit from the estimated static signal probability within each block of circuitry in the plurality of blocks of circuitry;
   estimating, using the computer, dynamic signal activity within each block of circuitry in the plurality of blocks of circuitry; and
   deriving, using the computer, a dynamic power consumption of the circuit from the estimated dynamic signal activity within each block of circuitry in the plurality of blocks of circuitry.

9. The method according to claim 8, wherein the integrated circuit (IC) comprises a programmable logic device (PLD).

10. The method according to claim 8, wherein the circuit comprises a look-up table (LUT).

11. The method according to claim 8, wherein the circuit comprises an adder.

12. A computer-implemented method of estimating power consumption of a routing resource in an integrated circuit (IC), the method comprising:
    decomposing, using a computer, the routing resource into a plurality of blocks of circuitry;
    estimating, using the computer, static probabilities for each input of the routing resource; and
    calculating, using the computer, static power consumption by summing power consumption of each block in the plurality of blocks for each possible combination of the estimated static probabilities for each input of the routing resource.

13. The method according to claim 12, further comprising calculating, using the computer, dynamic power consumption by estimating an amount of power consumed per transition on each input of each block of circuitry in the plurality of blocks of circuitry.

14. The method according to claim 13, further comprising estimating, using the computer, a power consumption of a driver circuit within the routing resource.

15. The method according to claim 13, wherein each block of circuitry in the plurality of blocks of circuitry comprises a multiplexer (MUX).

16. The method according to claim 15, wherein estimating the amount of power consumed per transition on each input of each multiplexer (MUX) further comprises taking into account an operating mode of the multiplexer (MUX).

17. The method according to claim 16, wherein the operating mode of the multiplexer (MUX) comprises an unused mode.

18. The method according to claim 17, wherein the operating mode of the multiplexer (MUX) comprises a used-but-disabled mode.

19. The method according to claim 18, wherein the operating mode of the multiplexer (MUX) comprises an enabled mode.

20. The method according to claim 13, wherein the integrated circuit (IC) comprises a programmable logic device (PLD).

* * * * *